(12) United States Patent
Pihlaja

(10) Patent No.: US 7,056,042 B2
(45) Date of Patent: Jun. 6, 2006

(54) COVER STRUCTURE FOR A KEYPAD

(75) Inventor: Pekka Pihlaja, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/448,781

(22) Filed: May 29, 2003

(65) Prior Publication Data

US 2003/0223799 A1 Dec. 4, 2003

(30) Foreign Application Priority Data

May 30, 2002 (FI) ................................. 20021024

(51) Int. Cl.
*B41J 5/016* (2006.01)

(52) U.S. Cl. .................. 400/472; 400/491.3; 200/333; 200/513; 150/154

(58) Field of Classification Search ................ 400/713, 400/714, 472, 491.3; 150/154, 165; 200/293, 200/302.2, 333, 512, 513; D14/138
See application file for complete search history.

(56) References Cited

U.S. PATENT DOCUMENTS

| | | | | |
|---|---|---|---|---|
| 4,307,268 A | * | 12/1981 | Harper | 200/5 A |
| 4,322,587 A | * | 3/1982 | Burns et al. | 200/5 R |
| 4,746,043 A | * | 5/1988 | Booker | 224/219 |
| 4,892,988 A | * | 1/1990 | Ishii | 200/516 |
| 4,901,074 A | * | 2/1990 | Sinn et al. | 341/22 |
| 5,080,155 A | | 1/1992 | Crozier | |
| 5,313,027 A | | 5/1994 | Inoue et al. | |
| 5,383,091 A | * | 1/1995 | Snell | 361/679 |
| 5,399,823 A | | 3/1995 | McCusker | |
| 5,990,772 A | * | 11/1999 | Van Zeeland | 335/207 |
| 6,082,535 A | * | 7/2000 | Mitchell | 206/320 |
| 6,158,884 A | * | 12/2000 | Lebby et al. | 368/282 |
| 6,262,646 B1 | * | 7/2001 | Van Zeeland | 335/205 |
| 6,285,299 B1 | * | 9/2001 | King-DeBaun | 241/23 |
| 6,377,246 B1 | | 4/2002 | Wild | |
| 2002/0093436 A1 | * | 7/2002 | Lien | 341/34 |

FOREIGN PATENT DOCUMENTS

| | | |
|---|---|---|
| EP | 0181130 | 5/1986 |
| EP | 0322515 | 7/1989 |
| GB | 1593414 | 7/1981 |
| JP | 166871 A | 6/2001 |

OTHER PUBLICATIONS

Abstract of JP 2001166871 A & JP 2001166871 A from Patent Abstracts of Japan.
Abstract of JP 2001166871A from WPI/Derwent.

* cited by examiner

*Primary Examiner*—Andrew H. Hirshfeld
*Assistant Examiner*—Jill E. Culler
(74) *Attorney, Agent, or Firm*—Ware, Fressola, Van Der Sluys & Adolphson LLP

(57) ABSTRACT

A top structure for a keypad, comprising a number of key caps. The structure comprises a solid flexible layer, which is placed above the key caps or directly on them, and arranged to yield when the key is felt. The material, properties and thickness of the flexible layer are selected so that the key cap can be perceived by a sensation of touch and found under the layer, when the key is felt. The flexible layer is, for example, of a textile or textile-imitating material. The top structure can be utilized in a keypad component, in an electronic device, particularly a mobile phone, and in clothing provided with a keypad.

25 Claims, 5 Drawing Sheets

COVER STRUCTURE FOR A KEYPAD

CROSS-REFERENCE TO RELATED APPLICATIONS

This application claims priority under 35 USC §119 to Finnish Patent Application No. 20021024 filed on May 30, 2002.

FIELD OF THE INVENTION

The invention relates to a cover structure for a keypad. The invention also relates to a keypad component, an electronic device, and clothing comprising said cover structure.

For storing various data, known electronic devices are available, such as notepad computers, small hand-held computers or personal digital assistants (PDA). Information can be viewed on the display of the device. The data is normally input in these devices by means of a keypad. Also wireless communication devices, such as mobile phones, comprise a keypad and a display for storing or selecting telephone numbers. There are also known devices available, which combine two different user interfaces, such as a cellular mobile telephone (CMT) interface for mobile phone functions and a user interface for a PDA device.

BACKGROUND OF THE INVENTION

In prior art, key caps for the keypad of a PDA/CMT device are attached, for example, to a key mat of rubber, which is positioned on a circuit board inside the device. The lower surface of the mat is provided with metal cupolas for clicking and electrical shorting. The keys give the user's finger a feeling about the operation both when the key is pressed down and when it is released. The upper surface of the key to be pressed is normally convex, curved or flat, and the shape of the key cap is normally circular or rectangular. The feeling is transmitted by popping of the key which can be felt and often also heard. The clicking and the feeling are produced in a way known as such by means of tensioned cupola-like or dome-like structures as they move and as the force required for compression is changed. The feedback about the keystroke can also be produced by an active electronic component, for example a piezoelectric element, when for example film switches are used.

At the cupola, the key mat is provided with a bulge to which the key cap is connected. The keys extend through holes made in the outer cover of the device, and at the same time, the outer cover forms the cover to protect the key mat and the circuit board. Alternatively, the key cap may be connected by means of a conical collar, whose buckling upon a keystroke will give a feeling about the operation. Alternatively, the key cupola extends through openings in the rigid cover layer, wherein the key caps are, in turn, placed on the cover in a desired way. The key caps are possibly fixed to the flexible key mat, which is hidden under the outer cover of the device. The outer cover, in turn, comprises openings through which the keys extend, wherein they are either on the level of the outer cover or slightly above it.

In electronic devices of prior art, one disadvantage is that the size of the key caps is relatively small and thereby the markings made on the outer surface of the key cap cannot be easily read or perceived. Naturally, the key caps can be made larger, but it will thus become more difficult to find the point to be pressed, or the centre, by a sensation of touch. Furthermore, the mechanics of large keys will become complicated to prevent the tilting or jamming of the key cap, if necessary, and to secure the maintenance on the correct height level. Furthermore, one must secure that the whole key goes down, if the point of pressing is at an edge. Normally, the keys must be placed close to each other, wherein also the adjacent key may be accidentally activated, because their edges are close to each other. Individual keys separated by the frame structure are useful in the sense that false keystrokes are prevented in a better way.

Film-like keypads have a wide flat surface where it is possible to make even large markings, but the problem is that the feeling about the operation of the key is also insufficient. Furthermore, the correct point that should be pressed down cannot be felt or found by a fingertip and a sensation of touch, because the surface is even and uniform and the symbols likewise even through they may be large.

It is not always appropriate or possible to equip the keypad, for example, with embossings, because it is expensive to manufacture moulded key caps for different language versions. The embossment and the varying surface quality also make it more difficult to print the key graphics. Normally, a clear sensation and confirmation about the operation is not obtained until the moment of the operation of the key, wherein it will not help to find the correct point to press. The key caps, however, can be easily identified by sensation, and it is thus easy to focus the keystroke. Particularly when cupola-like buckling structures are used, it is possible to obtain a clear sensation of touch that a contact has been made and the key has functioned. This kind of function is not typical of film keys, in turn, which have been primarily aimed at achieving a thin structure, wherein the operation and the point to be pressed down are indeterminate.

SUMMARY OF THE INVENTION

The aim of this invention is to achieve an improvement to the prior art, to provide key symbols with a large size by using a wide and flat keypad surface and a clear sensation of touch about the operation of the keypad. By means of the invention, particularly the point that should be pressed by the fingertip can be found in an accurate and reliable way.

The invention is based on the idea of using a special cover structure placed above and preferably also around the keypad, particularly several key caps. The cover structure comprises at least a uniform elastic or sufficiently yielding layer covering the key caps and bending down when the keys are pressed down. The key caps can now be easily found under the flexible layer in such a way that the flexible layer is felt by touching before the keystroke. The correct point to be pressed can now be easily found, even though the keys were invisible.

In particular, the aim is that the key cap can be clearly perceived by a sensation of touch and be localized under the cover layer at the same time when the key is being pressed down. For this reason, the material, properties and dimensions of the material of the cover layer are selected to be suitable, to provide and maintain the desired sensation of touch. At the same time, the upper surface of the key cap can be designed in such a way that can be best recognized by the sensation of touch.

According to a particular embodiment, the upper surface of the key cap has a convex or spherical shape. Large key caps cannot be made convex, because they would thus become relatively high. By the invention, the key caps may even be small, wherein it is possible to use a convex surface.

In one particular embodiment of the invention, the operation of the keypad is also based on the use of buckling cupola structures, which give the fingertip a clear sensation of the moment of operation of the key.

As to the cupola structures, it is possible to apply techniques known as such, and this also applies to the key caps, as regards their attachment onto, for example, the cupola structures or a frame above the cupola structures.

According to a particular alternative, the key caps are integrated in the cover layer, which forms a uniform component that is placed on the cupola structures.

DESCRIPTION OF THE DRAWINGS

In the following, the invention will be described in more detail by using as an example an advantageous embodiment of the invention. At the same time, reference will be made to the appended drawings, in which.

DETAILED DESCRIPTION OF THE INVENTION

In FIGS. 1 to 10, a cover layer 1 and a component 24 are only shown to the necessary extent, primarily with at least one key cap, but they are applied in keypads of different sizes and dimensions. The figures are limited to the object outlined with a broken line 26. The keypads normally comprise several keys complying with those shown, placed close to each other. Thus, examples include the keypads of mobile phones and personal digital assistants (PDA).

Figure 1:
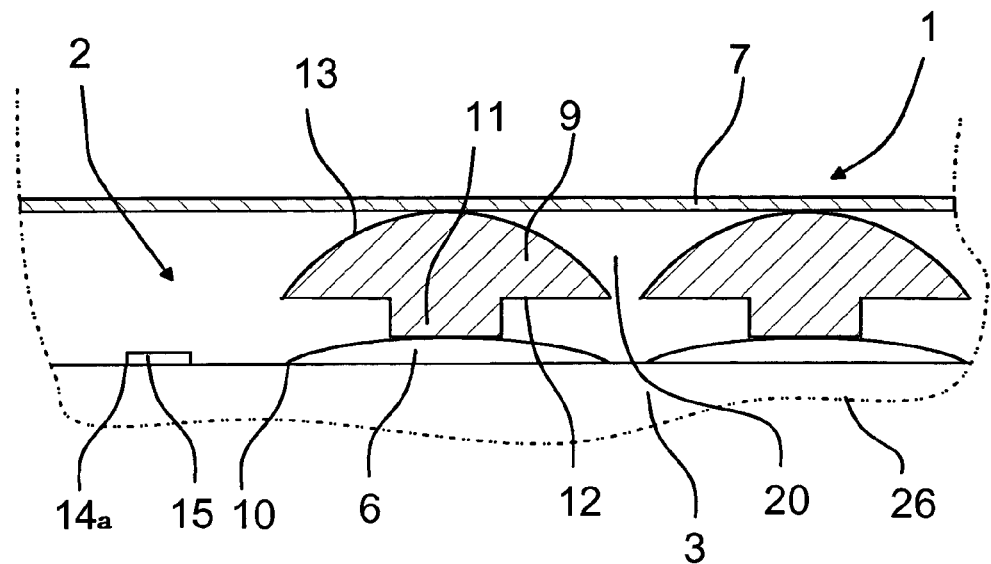
FIG. 1 shows a cross-section of a cover structure and key caps, seen from the side.

FIG. 1 shows the cover layer 1 which is placed above the keypad 2 in FIG. 1. In this case, the keypad 2 comprises a rigid shielding cover 3, the cover structure 1 being placed on top of its upper surface. The cover 3 comprises a number of openings 10, through which key cupolas 6 or corresponding cupola structures placed on the circuit board (not shown) are placed. Alternatively, the cupolas 6 are fixed to a mat, which is placed between the cover 3 and the circuit board or, if necessary, even on the cover 3, if this is possible in view of the keypad and the electronic device. Above each cupola 6, there is key cap 9, whose lower surface 12 is provided with a protrusion 11 affecting the cupola 6 when the key 9 is pressed down. The upper surface 13 of the cap 9 is preferably convex or has the shape of a circular arc.

Figure 2:
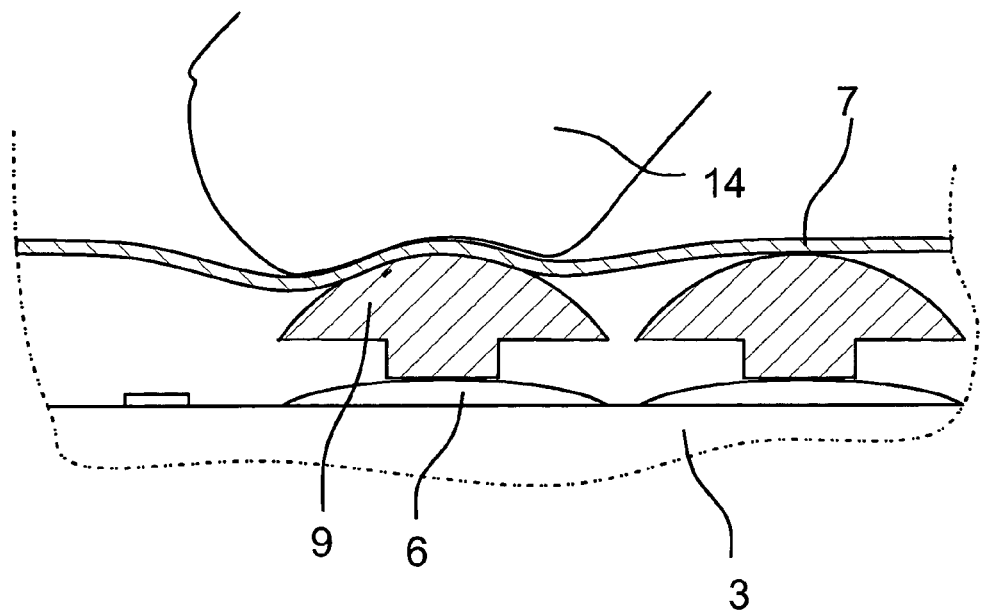
FIG. 2 shows the structure of FIG. 1 during the feeling.

The structure of the top layer 1 comprises a uniform elastic layer 7 placed above the key caps 9. The layer 7 is arranged to yield when the key 9 is pressed down with a finger 14 as shown in FIG. 2. The material of the layer 7 does not necessarily need to be elastic but sufficiently flexible or stretchable in its structure to yield under the finger 14 and to be placed against the upper surface 13 of the cap 9. The cover 3 and the layer 7 are placed within a distance from each other, and in this case, they are separated by an air layer 20. The distance must be such that the cap 9 and the layer 7 have a sufficient space to move. The layer 7 yields at least at the point pressed down by the finger 14 but it also goes down around this point, forming a hollow. The material of the layer 7 is stretched for example in a frame surrounding the keypad and the key caps, and said frame forms an integrated part of the outer cover for an electronic device, particularly a mobile phone, wherein the layer 7 is placed at the level of the outer surface of the device, or slightly underneath it. The layer 7 yields in such a way that it comes against the surfaces of the key 9 as well as possible when felt by the finger 14 so that the shapes of the key 9 could be easily perceived by a sensation of touch through the layer 7. Thus, one should particularly perceive, for example, the curvature of the key 9 or, if necessary, the point of its edge.

The layer 7 is a thin film or material layer, whose upper surface is preferably flat and equipped with markings and symbols denoting the function of the key 9 at the point in question. The film 7 can be easily exchanged for different language versions. If necessary, the film 7 may be at least partly transparent, wherein it can be provided with a backlight to improve the visibility of the keypad. Normally, the film 7 is opaque, wherein the key cap 9 is hidden. With a suitable selection of materials, it is also easy to improve the watertightness. The film 7 is, for example, of a suitable plastic material; it is made, or example, of silicon by moulding, wherein the shape of the film 7 may also be curved, wherein if conforms better to the design of the rest of the outer surface of the device. Other materials include rubber, polyurethane, or materials used in flexible displays or in the structures of other touch surfaces or touch pads. According to one particular embodiment of the invention, the film 7 used is a flexible display or a touch surface, under which the key cap 7 is placed.

Preferably, the key cap 9 is also transparent, wherein LED components 15 placed on the circuit board illuminate better the keypad and the film 7 as shown in FIG. 1. The LED components 15 are placed in openings 14a provided in the rigid shielding cover 3.

The film 7 is preferably in direct contact with the upper surface of the cap 9, or directly above it. The film 7 can also be attached to the upper surface of the key caps 9, wherein the film 7 and the caps 9 can be installed as an integrated component, possibly also equipped with a frame. The attachment also makes the film 7 strong and straight, and at the same time, the keys 9 remain in their correct positions on the cupolas 6, if the caps 9 are not connected to anything else, for example a mat or another layer.

The cap 9 can now be easily and clearly found underneath the elastic layer 7 by a sensation of touch, wherein the pressing can be focused exactly on the correct position. The convex shape of the cap 9 will give a clear sensation of where the centre of the key 9 is. The uppermost surface of the cap 9 may also be partly flat, wherein the attachment of the film 7 takes place on a larger area. It is thus advantageous that the flat area is surrounded by a circular convex surface. According to one alternative, the cap 9 is flat, wherein the point of the key 9 can be primarily localized by a sensation of touch to find the sharp edge and preferably curved shape of the cap 9. The curved edge will better indicate in which direction the centre of the key is. The size and shape of the cap 9 are selected particularly considering that the correct point to press, especially the centre of the key, is easy to find.

Figure 10:
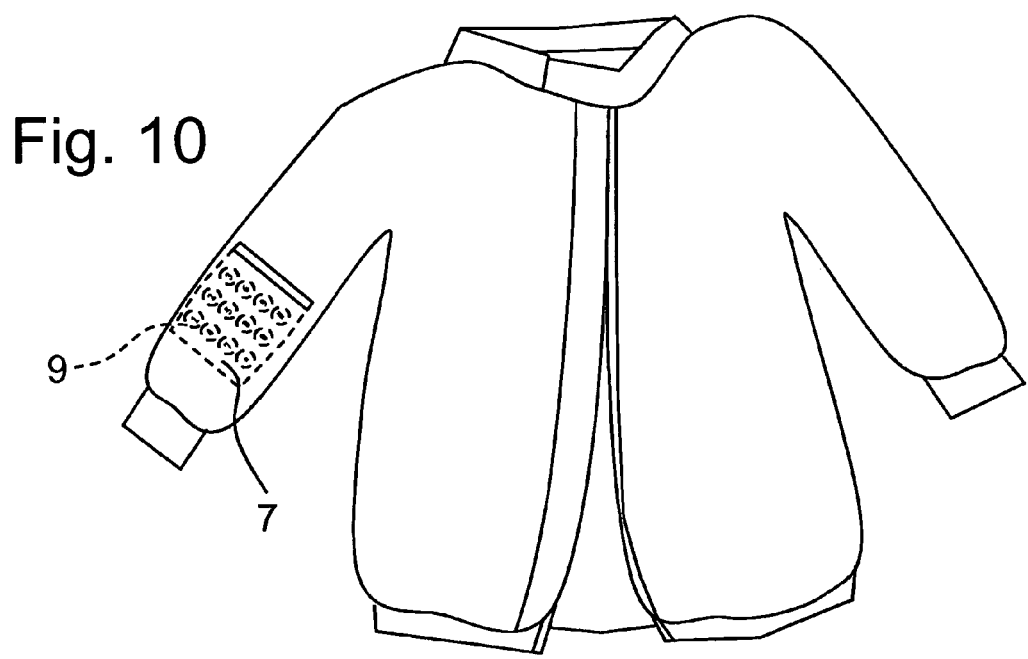
FIG. 10 shows a front view of a piece of clothing incorporating the present invention.

According to one particular embodiment, the layer 7 is a textile or a corresponding material, wherein the keypad has some special applications. The layer 7 is thus a material layer of smart clothing, particularly the outer layer under which the keypad component is placed. In this case, the keypad component comprises, for example, a cover structure 3 of FIG. 3, the circuit board and the other necessary electronics being placed therein. The component is placed, for example, in a separate pocket, which places and fixes it precisely in the desired position. The positioning is important particularly in the case that the key caps 9 are attached to the top structure 1, particularly the layer 7 or a layer directly underneath the layer 7. The cover 3, in turn, is placed under the textile layer in the clothing, and the textile layer, in turn, is provided with printed symbols corresponding to the keys. The layer 7 can also be placed under cover by a kind of a flap. See. FIG. 10.

Figure 3:
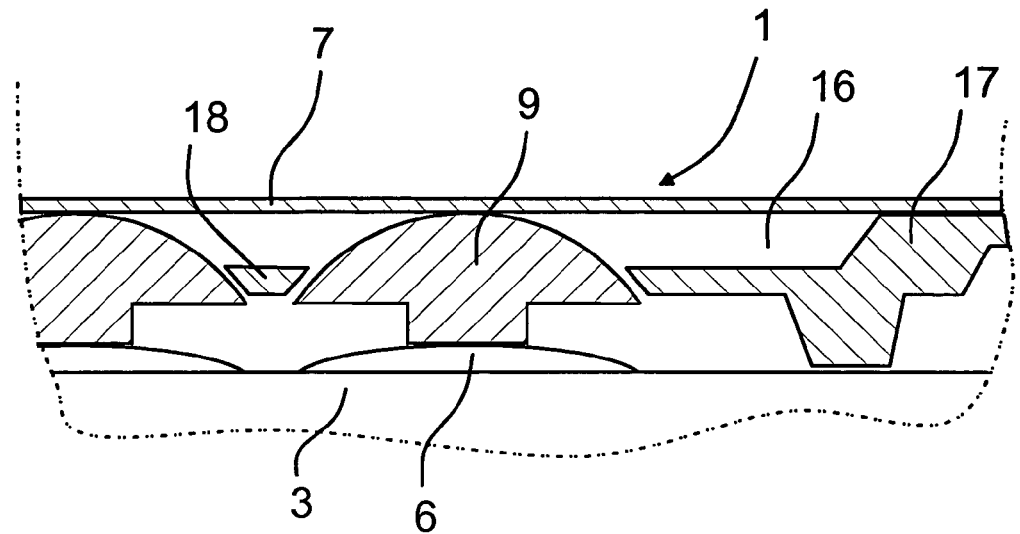
FIGS. 3 and 4 show a cross-section of a cover structure, key caps and an electronic device, seen from the side.
Figure 4:
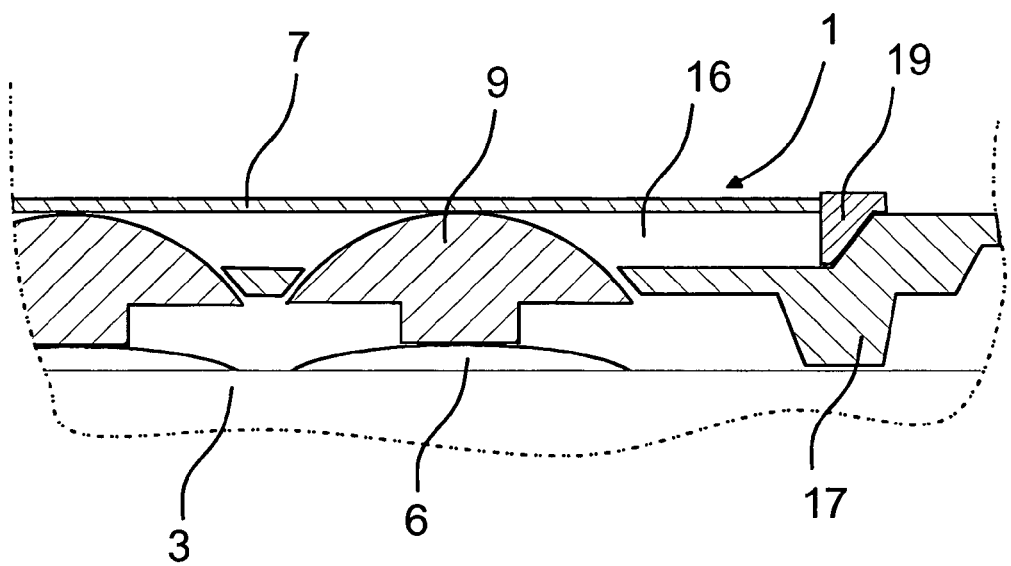

A textile or textile-imitating material is also used, for example, in mobile phones, wherein the film 7 envelopes the whole device like a sock. The film 7 is thus stretched around the device or at least at the keypad, and according to one embodiment, it forms a ring or the like, the device being placed therein. See FIG. 9. Thus, the appearance of the device can be easily changed as desired. It is thus advantageous that the key caps 9 are, as shown in FIG. 3, placed in a recess 16 in such a way that their upper surface is approximately at the level of the outer cover 17 of the device. It is thus possible that the cover 3 forms a part of the outer cover of the device, at least at the recess, wherein the cover 3 forms the bottom 18 of the recess. As shown in FIG. 4, the recess can also be lined by a frame 19, to which the film 7, in turn, is attached, wherein it does not extend around the whole device. In this way, the film can be easily arranged on the same level as the outer surface of the device. In one embodiment, the layer 7 or the textile is installed on the surface of the outer cover in a stationary and integrated way, wherein it can be possibly replaced together with the outer cover. The outer cover 17 and the layer 7 can be integrated during the manufacture of the outer cover. The layer 7 thus covers the whole area of the cover, or at least the area of the keypad.

Figure 5:
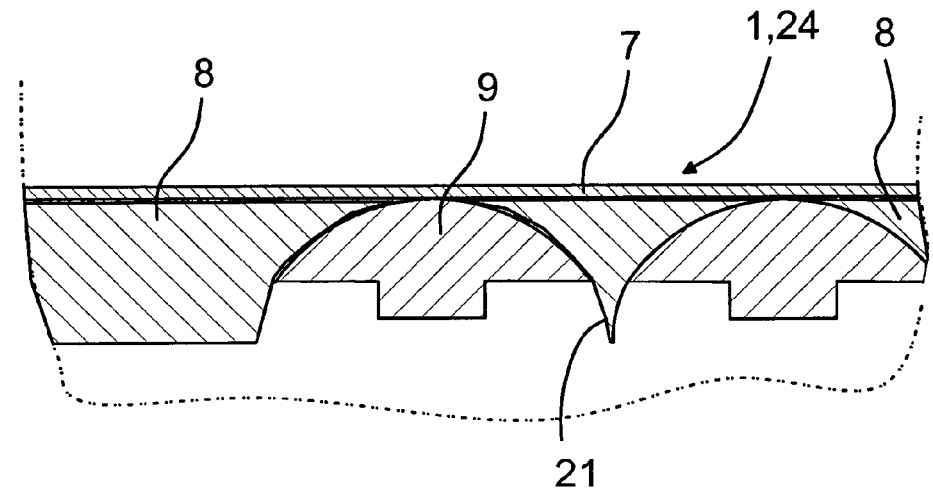
FIGS. 5, 6 and 7 show a cross-section of a cover structure or a cover layer component, and key caps, seen from the side.
Figure 6:
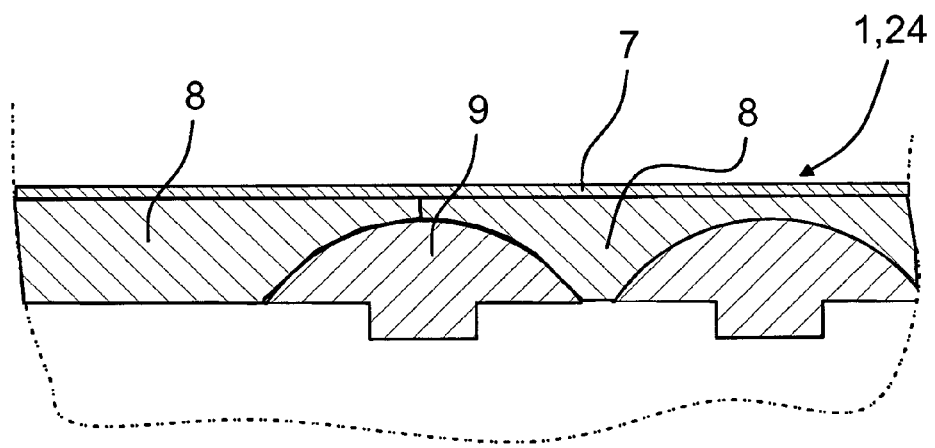

In one particular embodiment shown in FIGS. 5 and 6, under the film 7 there is also a flexible intermediate layer 8, which is of a particularly suitable foamed elastic or flexible plastic material, which yields with the film 7. The film 7 and the intermediate layer 8 are preferably attached to each other, wherein the film 7 remains straight better, and simultaneously the intermediate layer 8 helps the film to bounce straight after the keystroke. The intermediate layer 8 must also be suitable for back-lighting, wherein the material is preferably light diffusing so that it can be utilized for levelling out the illumination. The illumination is provided, for example as shown in FIG. 1, by means of LED components 15, wherein the air layer 20 is replaced by an intermediate layer 8.

The intermediate layer 8 is provided with openings or recesses 21, in which the caps 9 are placed so that the key caps 9 and the intermediate layer 8 are on the same level and the caps 9 are surrounded by the intermediate layer 8. Preferably, the cap 9 and the intermediate layer 8 are, on the sides of the cap 9 and also above it when necessary, directly against each other as shown in FIGS. 5 and 6, wherein the shape of the intermediate layer 8 follows, for example, the curved shape of the cap 9, and upon a keystroke, the intermediate layer 8 is partly left between the cap 9 and the layer 7. However, the material, dimensions and properties of the intermediate layer are selected so that the shape of the key 9 can still be clearly sensed by touching. Advantageously, the intermediate layer 8 is not placed under the cap 9, wherein the movement of the cap 9 downwards is freer. FIGS. 5 and 6 show alternatives, in which the thickness of the intermediate layer 8 and the distance between the key cap 9 and the layer 7 vary. The selection is affected by both the more detailed structure of the keypad placed under the top structure 1, and the shape of the outer cover of the device.

In one embodiment, in which the device is provided with a recess 16 at the keypad as shown in FIGS. 3 and 4, the intermediate layer 8 is placed in said recess, filling it completely, if necessary.

The cap 9 can also be attached to the intermediate layer 8, wherein it is possible to form a top layer component 24 which simultaneously forms the top structure 1 comprising the layer 7, the intermediate layer 8 and a number of key caps 9, as shown in FIGS. 5 and 6. The component may be, for example, a large planar continuous structure provided with several structures for different keypads. After this, a separate part is cut off from the structure for each keypad and placed in its position, for example, directly in a device or in a frame, which is, in turn, connected to the device. The film 7 and the intermediate layer 8 can be made in a continuous process either together or separately, and they are also provided with openings or shapes for the caps 9. The key caps 9 can be set and fastened automatically. The key caps 9 can also be separate, if a rigid or suitably flexible bottom layer 22 is placed underneath the intermediate layer 8 and provided with openings 23 at the caps 9, but the size of the openings 23 is not larger than the diameter of the caps 9 wherein the caps 9 do not fall. If necessary, the caps 9 extend through the bottom layer 22 also when pressed down, depending on the height position of the cupola structure, the dimension of the key, and the rest of the structure of the device. Preferably, the height of the intermediate layer 8 corresponds to the height of the cap 9, and the film 7 is thin but the bottom layer 22 may be thicker than the film 7.

Figure 7:
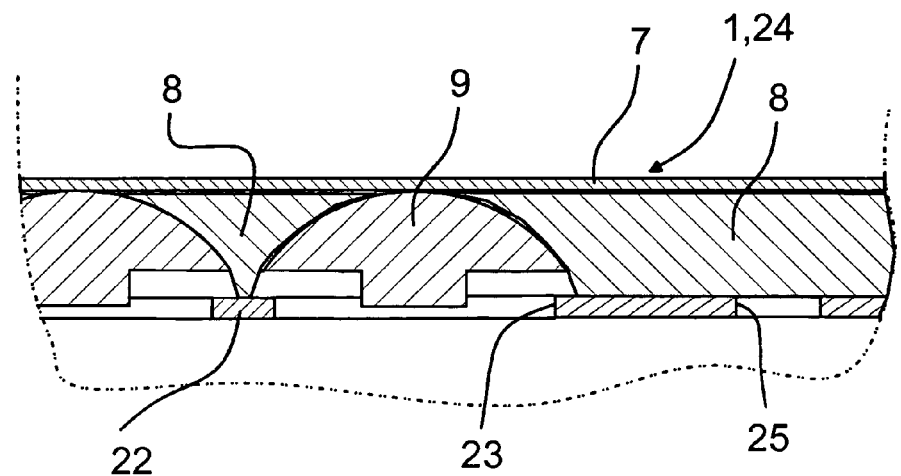
Figure 8:
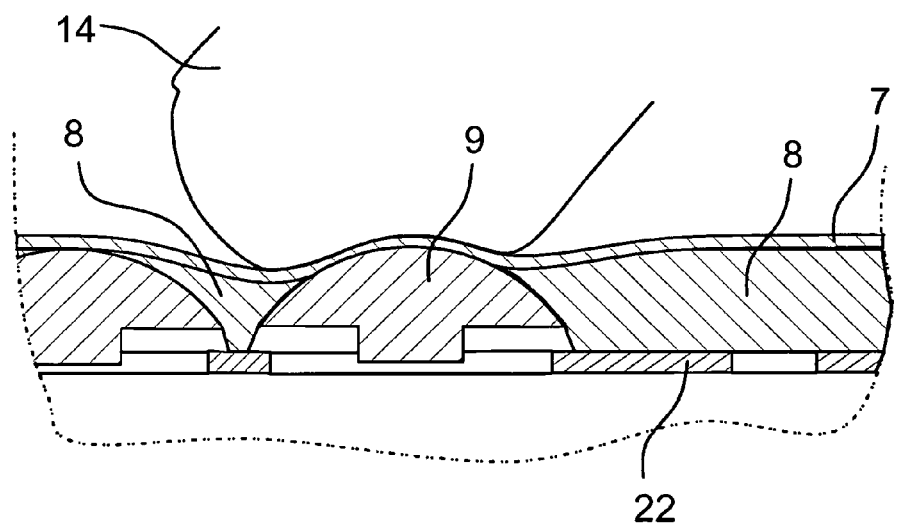
FIG. 8 shows the structure of FIG. 7 during the feeling.
Figure 9:
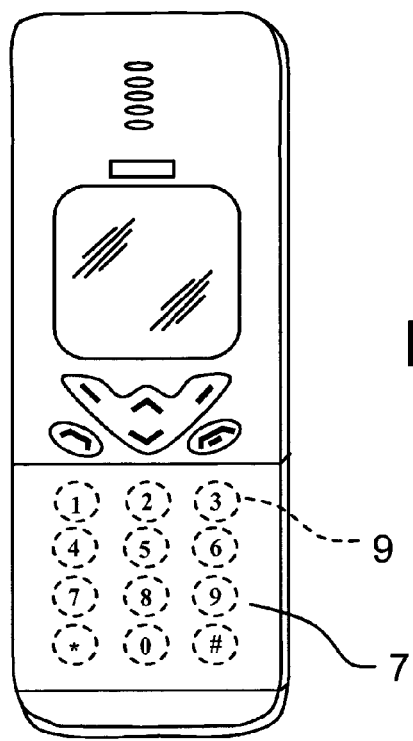
FIG. 9 shows a perspective view of an electronic device, particularly a mobile phone, incorporating the present invention.

If necessary, the top structure component 24 may also comprise only the layers 7 and 8 and the bottom layer 22, wherein it is placed separately on the caps 9 which are already in position in the device. The component 24 is placed, for example, on the cover 3 in FIG. 1 or on the bottom 18 of the recess 16 in FIG. 3. The bottom layer 22 makes the structure stronger and also prevents the movement of the top structure 1 or the component 24 in the lateral direction, if it is provided, for example, with openings 25, as shown in FIGS. 7 and 8, for example openings 25, in which the structures protruding from the surface of the cover 3 are placed, for example for positioning. Said structures are, for example, screw-heads. FIG. 8 shows in more detail the situation in which the intermediate layer 8 is compressed when pressed down with a finger 14, but after that it can bounce to the position of FIG. 7 again.

The top structure shown in FIGS. 1, 5 and 7 can also be attached to a keypad 2 which is a separate component comprising, for example, a cover 3 and other necessary components, such as key mats or the like. The cover 3 can be merely a shielding cover, but if necessary, it may contain electronic components. Thus, the keypad 2 and the top structure 1 constitute an integrated keypad component which complies, for example, to that of FIG. 1 and which is installed in the electronic device.

In an advantageous embodiment, the diameter selected for the key is about 5 mm, to provide a sufficient, perceptible force effect on the fingertip and a sensation of touch. On the other hand, the diameter must not be so small that the keystroke could be felt as pain. The required force depends, for example, on the principle of operation of the cupola structures or other structures responsible for the coupling.

The thickness selected for the flexible film is from 0.2 to 0.7 mm. The thickness of the key cap and the intermediate layer is about 1 mm.

The invention has been illustrated with examples above, but it is not limited solely to these advantageous embodiments. The invention can also be applied within the scope of the appended claims.

The invention claimed is:

1. A top structure for a keypad, the top structure is placed in a pocket to fix the top structure precisely in a desired position, the keypad comprising a number of separate key caps placed above cupola structures or other structures responsible for coupling, the key caps arranged to affect said structures when the keys are pressed down, wherein the top structure comprises:
 a uniform flexible layer, which is placed above the key caps or directly on top of them and is arranged to yield when the key cap is felt, wherein the flexible layer is straight above the key caps, the key caps having the size and shape of the upper surface of the key cap selected so that the correct point to be pressed down can be easily found by a sensation of touch, the flexible layer is a part of clothing in which said keypad is also placed, and
 an intermediate layer, which is placed underneath the flexible layer and arranged to surround the key caps in such a way that movement of an individual one of the key caps during a keystroke is possible.

2. The top structure according to claim 1, wherein the material, properties and thickness of the flexible layer are selected so that the key cap can be perceived by a sensation of touch and found under the flexible layer, when the key is felt.

3. The top structure according to claim 1, wherein the flexible layer is chosen from the group consisting of a textile and a textile-imitating material.

4. The top structure according to claim 1, wherein the flexible layer is arranged to cover at least an area formed by the key caps in its entirety.

5. The top structure according to claim 1, wherein the flexible layer, being installed integrally with the top structure in an electronic device, covers an area of the keypad and to surround the electronic device in which the keypad is fitted.

6. The top structure according to claim 5, wherein the flexible layer is chosen from the group consisting of a textile and a textile-imitating material.

7. The top structure according to claim 5, wherein the flexible layer is arranged to envelope the electronic device as a ring.

8. The top structure according to claim 1, wherein the intermediate layer is solid and defines a number of openings, in which the key caps are intended to be placed.

9. The top structure according to claim 1, wherein the intermediate layer is solid and arranged to be placed tightly against at least the sides of the key cap.

10. The top structure according to claim 9, wherein the intermediate layer is also arranged to be placed tightly against an entire top surface of each key cap.

11. The top structure according to claim 9, wherein the intermediate layer is also arranged to be placed tightly against any part of a top surface of the key cap which is not placed against the flexible layer.

12. The top structure according to claim 1, wherein the intermediate layer is of a flexible material, whose thickness is allowed to change when pressed down.

13. The top structure according to claim 1, wherein the material and thickness of the intermediate layer and the flexible layer are selected so that the key cap can be perceived by a sensation of touch and found under said intermediate and flexible layers, when the key cap is felt.

14. The top structure according to claim 1, wherein the intermediate layer is of a foamed flexible plastic material.

15. The top structure according to claim 1, wherein the intermediate layer is arranged to cover at least an area of the keypad.

16. The top structure according to claim 1, wherein the intermediate layer is arranged to be placed in a recess in an electronic device, in which the keypad is placed, wherein the flexible layer is simultaneously arranged to cover said recess.

17. The top structure according to claim 1, wherein the flexible layer is arranged in a frame, which can be connected to an electronic device, in which the keypad is placed.

18. The top structure according to claim 1, wherein the flexible layer is arranged to bounce to its original position after a keystroke.

19. The top structure according to claim 1, wherein the flexible layer and the intermediate layer are attached to each other, wherein they form an integrated component which can be placed around the key caps.

20. The top structure according to claim 1, wherein the flexible layer and the intermediate layer are attached to each other, the key caps being placed in the intermediate layer, wherein the flexible layer, the intermediate layer and the key caps together constitute an integrated component being the top structure.

21. The top structure according to claim 1, wherein the key caps are arranged to be placed on the cupola structures of the keypad, which operate by buckling and bouncing and which are intended to provide a clear feeling of the operation of the key.

22. The top structure according to claim 1, wherein the flexible layer is equipped with symbols visible to the user and describing the functions of the keys.

23. The top structure according to claim 1, wherein the material and structure of the intermediate layer is light diffusing, wherein it is available for lighted keypads.

24. The top structure according to claim 1, wherein the top structure is integrated in an outer rigid shielding cover of an electronic device, particularly a mobile phone.

25. Clothing comprising a top structure which is intended for a keypad placed or to be placed in the clothing, the top structure is placed in a pocket to fix the top structure precisely in position, wherein the keypad comprises a number of separate key caps placed above cupola structures or other structures responsible for coupling, the key caps arranged to affect said structures when the key caps are pressed down, and wherein the top structure comprises:
 a uniform flexible layer, which is placed above the key caps or directly on top of them and is arranged to yield when the key cap is felt, wherein the flexible layer is planar above the key caps, the key caps having the size and shape of the upper surface of the key cap selected so that the correct point to be pressed down can be easily found by a sensation of touch, and
 an intermediate layer, which is placed underneath the flexible layer and arranged to surround the key caps in such a way that movement of an individual one of the key caps during a keystroke is possible.

* * * * *